United States Patent [19]
Darsillo et al.

[11] Patent Number: 5,827,363
[45] Date of Patent: Oct. 27, 1998

[54] STRUCTURE PRECIPITATED SILICATES AND SILICAS, PRODUCTION AND USE IN INK JET PRINTING

[75] Inventors: Michael S. Darsillo, Wadsworth; Sturgis Gregg Allen, Copley, both of Ohio

[73] Assignee: Degussa Corporation, Ridgefield Park, N.J.

[21] Appl. No.: 767,677

[22] Filed: Dec. 17, 1996

Related U.S. Application Data

[60] Provisional application No. 60/008,882 Dec. 19, 1995.
[51] Int. Cl.$^6$ .................................................. C04B 14/04
[52] U.S. Cl. .................. 106/484; 106/31.65; 106/31.9; 106/482; 106/492; 423/335; 423/339
[58] Field of Search ................................. 106/31.65, 31.9, 106/482, 484, 492; 423/335, 339

[56] References Cited

U.S. PATENT DOCUMENTS

4,915,923   4/1990   Ogawa et al. ........................... 423/335

*Primary Examiner*—Mark L. Bell
*Assistant Examiner*—Scott L. Hertzog
*Attorney, Agent, or Firm*—Beveridge, DeGrandi, Weilacher & Young, L.L.P.

[57] ABSTRACT

A method for preparing precipitated silicates and silicas having good high shear rheology in high solids aqueous slurries. Destructuring of aluminum silicate and silica via dry milling results in decreasing DBP oil absorption. The destructured materials are useful for ink jet coating formulations.

15 Claims, 12 Drawing Sheets

STRUCTURE PRECIPITATED SILICATES AND SILICAS, PRODUCTION AND USE IN INK JET PRINTING

REFERENCE TO A RELATED APPLICATION

This application claims the benefit of our copending provisional application 60/008,882 filed Dec. 19, 1995 which is relied on herein and incorporated by reference.

INTRODUCTION AND BACKGROUND

The present invention relates to low structure precipitated silicates and silicas and to a method of producing such low structure precipitated silicates and silicas. In a further aspect, the present invention also relates to a method for improving the rheology of precipitated silicates and silicas.

Yet another aspect of the present invention relates to ink jet coating compositions containing the destructured precipitated silicates and silicas as described herein.

Synthetic amorphous precipitated silicas and silicates have been used in the paper industry as both fillers and coating pigments. Careful control of their properties allows them to be specifically engineered to meet the needs of the papermaker. This differentiates amorphous precipitated silicas and silicates from mineral pigments such as kaolin and ground $CaCO_3$ which are mined and then processed.

Production of precipitated silica begins with the reaction of an alkaline sodium silicate solution with a mineral acid, typically $H_2SO_4$, according to the following equation:

$$Na_2O{:}xSiO_2 + H_2SO_4 \rightarrow xSiO_2 + Na_2SO_4 + H_2O$$

In the case of synthetic silicates, a salt is used to acidify the sodium silicate solution. The reaction of alum with sodium silicate solution to produce a sodium aluminum silicate is as follows:

$$4[Na_2O{:}xSiO_2] + Al_2(SO_4)_3 \rightarrow NaAl_2O_3{\cdot}4[xSiO_2]{\cdot}4{-}6H_2O + 3Na_2SO_4$$

In both precipitated silica and silicate manufacture, the two reactants are added simultaneously to water with agitation. The process parameters which significantly influence the properties of the pigments during the precipitation step include temperature, solids content, concentration and addition sequence of the reactants. During the precipitation step, small primary particles in the size range of 10–40 nanometers ($10^{-9}$ meters) aggregate via strong hydrogen bonds to form three dimensional aggregates. The maximum aggregate size formed during precipitation is <1 micron. These aggregates, which are non-friable, are capable of withstanding the high capillary pressure that develops during drying. Finally, the aggregates combine to form agglomerates in the size range of 0.4–5 microns. In contrast to the aggregates, agglomerates are friable with friability increasing with increasing size.

Following precipitation, the suspension containing the fully formed agglomerates is pumped to special filter presses which produce filter cakes at relatively low solids content. Salts formed as byproducts during the precipitation process, predominately $Na_2SO_4$, are washed out at this point. Following filtration, the filter cake must be dried to remove as much water as possible. For paper applications, drying is followed by milling which reduces the size of agglomerates formed during the drying state.

The coalescence of primary particles to form aggregates, which then combine via strong hydrogen bonding to form agglomerates, results in precipitated silica or silicate agglomerates which have internal void volume or porosity. As a result of this porosity, the measurement of surface area by the BET $N_2$ adsorption measurement method includes contributions from external, as well as internal, surface area of the agglomerate. The internal porosity or void volume is typically measured by oil absorption methods (e.g., dibutylphthalate (DBP)). The measurement of oil absorption (cc/100 g) gives a direct indication of the degree of structure: very high (>200), high (175–200), medium (125–175), low (75–125), and very low (<75).

Synthetic amorphous precipitated silicas and silicates are low abrasions pigments. This is an important benefit to the papermaker since high abrasion in paper can result in accelerated wear on forming fabrics and slitter knives. Relative to kaolin clays, synthetic amorphous siliceous pigments are lower in abrasion than hydrous clays and are significantly lower in abrasion than calcined clays, paper grade talc and $TiO_2$. Another advantage is the ability of siliceous pigments to impart both brightness and opacity to paper. Precipitated amorphous silicate pigment as a filler in newsprint imparts a Tappi brightness similar to that of $TiO_2$ and significantly greater than that of a low brightness calcined clay.

Aluminum silicates such as Degussa's P820 (Pasilex®; see Degussa Technical Bulletin Pigments No. 2, Degussa—*Pigments for the Paper Industry*) find numerous uses in the paper industry (e.g., for coatings to reduce strike through and show through in newsprint) and in emulsion and decorative paints to increase whiteness and hiding power (see Degussa Technical Bulletin Pigments No. 34, *Aluminum Silicate P820 for Emulsion and Decorative Paints*).

Aluminum silicate P820 is currently supplied in the dry powder form which hinders its use in some applications, particularly in the paper industry, which is accustomed to receiving $TiO_2$ and minerals (e.g., kaolin and ground $CaCO_3$) in slurry form. The low solids content (20–45%) that can be achieved with Pasilex® slurry adds considerably to its expense. However, increasing the solids content of Pasilex® results in higher viscosity slurries making the fluid incapable of being pumped by conventional equipment. The normal pumping viscosity for most conventional pumps is 3000–5000 cps with viscosities above this range requiring special displacement pumps.

U.S. Pat. No. 5,261,956 shows that the rheological behavior of calcined clay slurries can be improved by destructuring the thermally structured mineral by milling. For example, calcined clay slurries, typically shipped at 49% solids, can be increased to 56% solids by ballmilling prior to slurrying. The resultant pigment when applied to paper as a coating shows only a slight decrease in sheet opacity due to the destructuring. However, calcined kaolin clays are very different materials in comparison to precipitated silicates and silicas.

SUMMARY OF THE INVENTION

An object of the present invention is to provide destructured precipitated silicates and silicas and to be able to increase the solids content in aqueous slurries of precipitated silicates and silicas, or to reduce the viscosity of aqueous slurries while holding solids content unchanged.

In one embodiment of the invention, there is disclosed a method of producing low structure precipitated silicate or silica having good higher shear rheology in high solids aqueous slurries. The method involves dry milling precipitated silicate or silica in a media mill for a sufficient period of time to achieve approximately a 30–60% reduction in structure. In addition, there is disclosed a low structure precipitated silicate or silica produced by this method.

In another embodiment of the invention, there is disclosed a method of preparing a high solids aqueous slurry of low structure precipitated silicate or silica having improved fluidity. The method involves dry milling precipitated silicate or silica in a media mill for a sufficient period of time to achieve a 30–60% reduction in structure and forming a solids aqueous slurry. In addition, there is disclosed a high solids aqueous slurry of low structure precipitated silicate or silica produced by this method.

Still another embodiment of the invention relates to ink jet coating formulations based on the destructured precipitated silicas and silicates described above whereby higher solids contents can be obtained compared with standard ink jet coatings or lower viscosities can be obtained without changing solids content.

BRIEF DESCRIPTION OF THE DRAWINGS

The invention will be further understood with reference to the drawings, wherein.

DETAILED DESCRIPTION OF THE INVENTION

In accordance with the present invention, a method is provided for the production of destructured precipitated silicates and silicas in order to increase the solids content in aqueous slurries of precipitated silicates and silicas. Precipitated silicates and silicas are dry milled in a media mill to produce the destructured precipitated silicates and silicas with increased particle size. No water is added to the milling process.

Milling the precipitated silicate or silica reduces the internal porosity as evidenced by a decrease in the DBP number. This results in a modification of the rheological properties of the slurry which increases the solids content without increasing viscosity.

The dry milling step is carried out in a media mill such as ball mills, attrition mills, and others known in the art. The media which can be utilized in the mill include ½ inch MgO stabilized Zirconia Cylinders and others known in the art. Besides aluminum silicates such as Degussa's P820 (Pasilex®), it is also possible to use other silica products such as Sipernat®50 and FK 500 LS, the latter especially suitable for use in ink jet coatings.

In accordance with a preferred aspect of the invention a precipitated silica known as FK500LS produced by Degussa was destructured via attritor milling. The milled product exhibits lower DBP numbers relative to the "as is" un-destructured material. Destructuring of the material allows the solids content of the silica in aqueous solution to be significantly increased with no increase in viscosity. Attritor milling of FK 500LS results in a precipitated silica particularly suitable for the coated ink jet paper market.

The accelerated growth in ink jet technology has placed greater constraints on the media, particularly in the area of four color printing. Silica coated papers are typically used for medium and high end color applications. A suitable formulation for converters and paper makers uses a 80:20 blend of precipitated and fumed silica in conjunction with a binder such as PVA (polyvinyl alcohol). The precipitated and fumed silica of choice are FK 310 and MOX 170, respectively, produced by Degussa.

The characteristics of FK 310 that make it applicable for ink jet media are an exceptionally high BET surface area of 650 $m^2/g$ and a moderate DBP oil absorption of 210. While FK 500LS can be a potential candidate for ink jet media, BET surface area of 450 $m^2/gram$, its high DBP oil absorption of 330 is detrimental to paper coating applications. High oil absorption leads to high viscosity coating formulations and unacceptably high binder demands.

The following examples serve to illustrate the present invention.

EXAMPLES 1 AND 2

Two separate tests were conducted which involved varying the amount of silicate charged into the test vessel, and the duration of milling. Physical characterization of the samples withdrawn from the ball mill at different times were conducted in order to better understand the morphological changes caused by the destructuring. Viscosity tests were conducted in the following manner: First, in Example 1, the solids level of the unmilled and destructured P820 slurries was kept constant and the Brookfield viscosity recorded using a brookfield Viscometer. Second, in Example 2, the viscosity levels were kept constant and the solids content varied in order to match viscosities.

Sample Preparation

The mill used for performing the test was an Attrition Mill, Model 1-S. The test tank used was lined with ceramic and the media used was ¼" Steatite ceramic balls.

First, 140 g of the silicate (250 g for example 2) was poured into the test tank. The silica loading was 150 g per batch and the rotational speed was set at 300 rpm. These values were selected based on past experience which showed optimum, or near optimum, destructuring capability for this mill.

Table 1 is a summary of changes in the physical characteristics of P820 due to ball milling for example 1. The loading level for the silicate was chosen using past experience. This silicate amount, while close to the optimum level for destructuring, did not supply enough of the much needed silicate for rheological testing. A second test run using more silicate with extended milling time was used to run viscosity testing.

Particle size has no real direct correlation with the amount of destructuring that occurs. The measured particle size, as measured by laser diffraction, actually increases due to the silicate being flattened during destructuring. The destructuring of the silicate reduces the internal porosity thereby decreasing the amount of liquid that can be absorbed allowing for higher slurry concentrations.

DBP absorption was determined using the Brabender Plasti-Corder and surface area was determined using a Micromeritics Gemini surface area instrument using the established multipoint BET method. The DBP numbers, along with the ΔDBP, confirm that the absorptivity of the silicate steadily decreases with an increase in milling time. A direct correlation can be made between "internal" surface area and the decrease in absorptivity of the silicate. As milling continues the sponge like properties of the silicate are decreased through destructuring thereby decreasing absorptivity.

Figure 1:
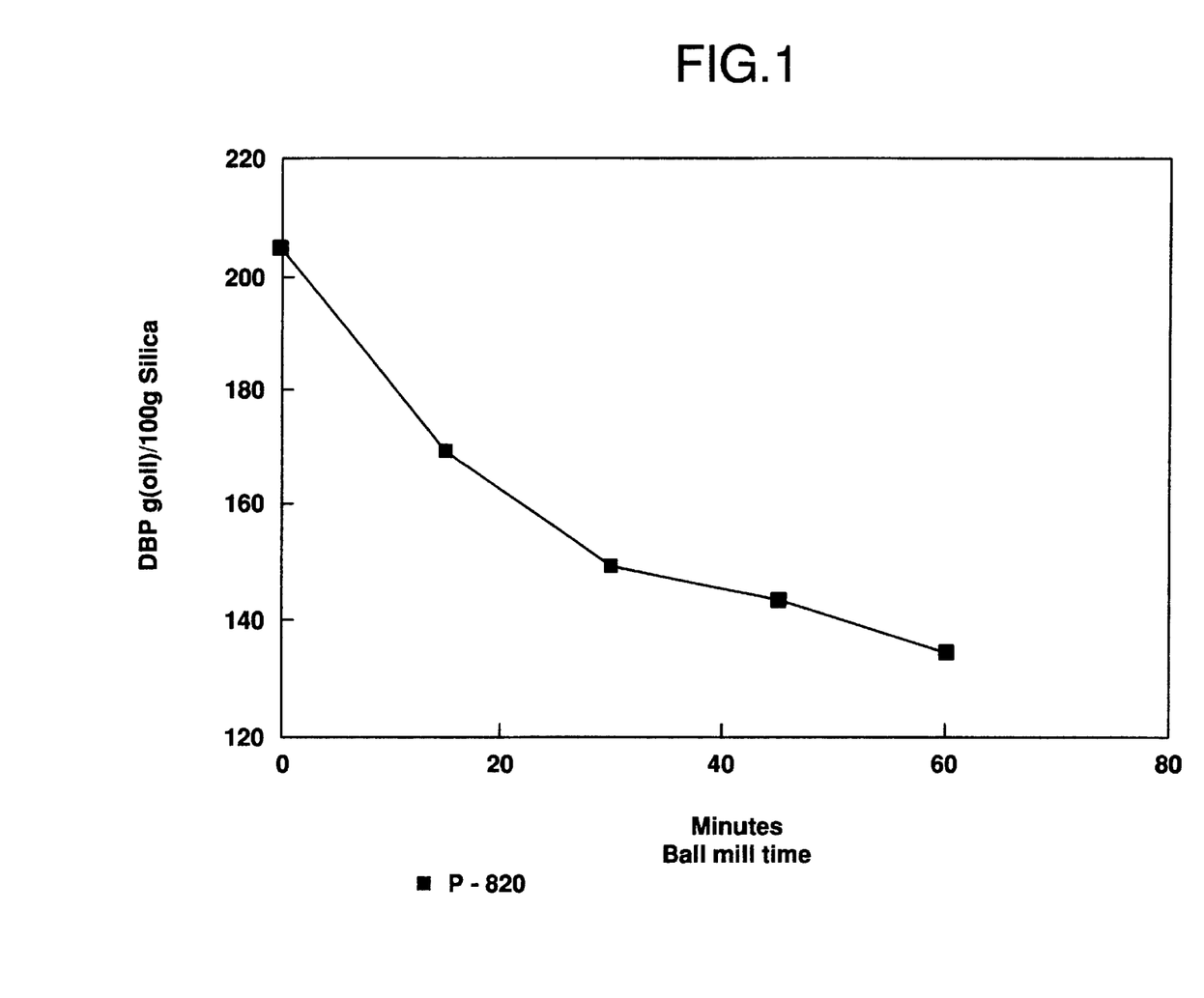
FIG. 1 is a graph showing the influence of milling time on DBP absorption in example 1 according to the invention.

FIG. 1 illustrates the decreasing absorptivity of the samples taken at different time intervals as milling proceeds during example 1. The plot of DBP vs. milling time clearly shows the rate of destructuring for the aluminum silicate. Initially the rate is fast and then the curve starts to asymptote whereby destructuring efficiency decreases.

Figure 2:
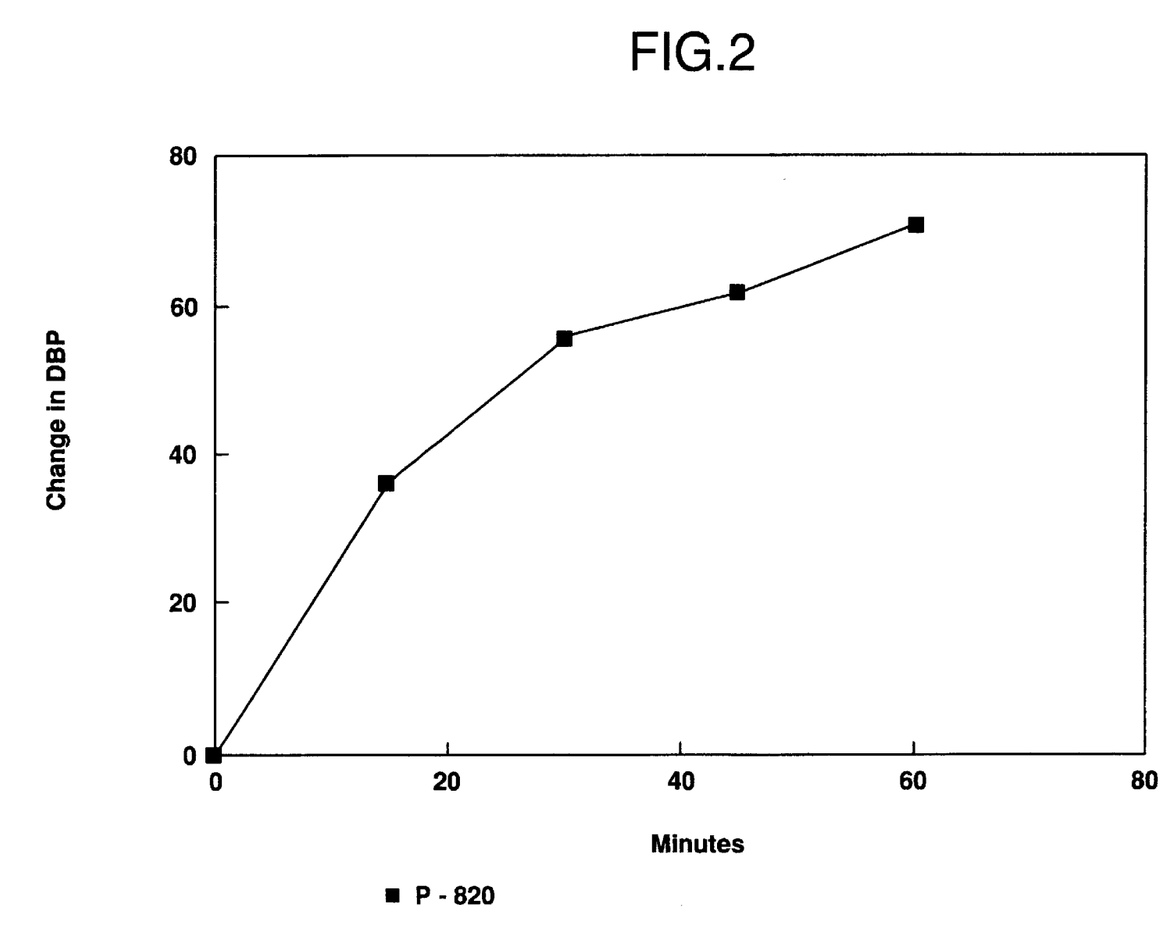
FIG. 2 is a graph showing the changes in DBP or (ΔDBP) over specific milling time intervals in example 1 according to the invention.

FIG. 2 is a plot of change in DBP vs. milling time. The plot clearly shows the changes in DBP (ΔDBP) over specific time intervals. The change is initially rapid but over time the rate decreases.

Table 2 is a summary of the rheological properties of the aluminum silicate from example 1. For these series of tests the solids concentration was set at 36.6% and the Brookfield viscosity of the slurries were determined as a function of milling time. The results indicate that milling significantly lowers slurry viscosity. For example, the viscosity data indicates that following 30 minutes of ballmilling, the viscosity of 36.6% slurry of P820 is decreased from 5280 to 66 cps. In addition, the slurry viscosity after 30 minutes of milling is essentially equivalent to that after 60 minutes, indicating that the degree of destructuring needed to significantly decrease the slurry viscosity has been achieved within 30 minutes of ballmilling.

Figure 3:
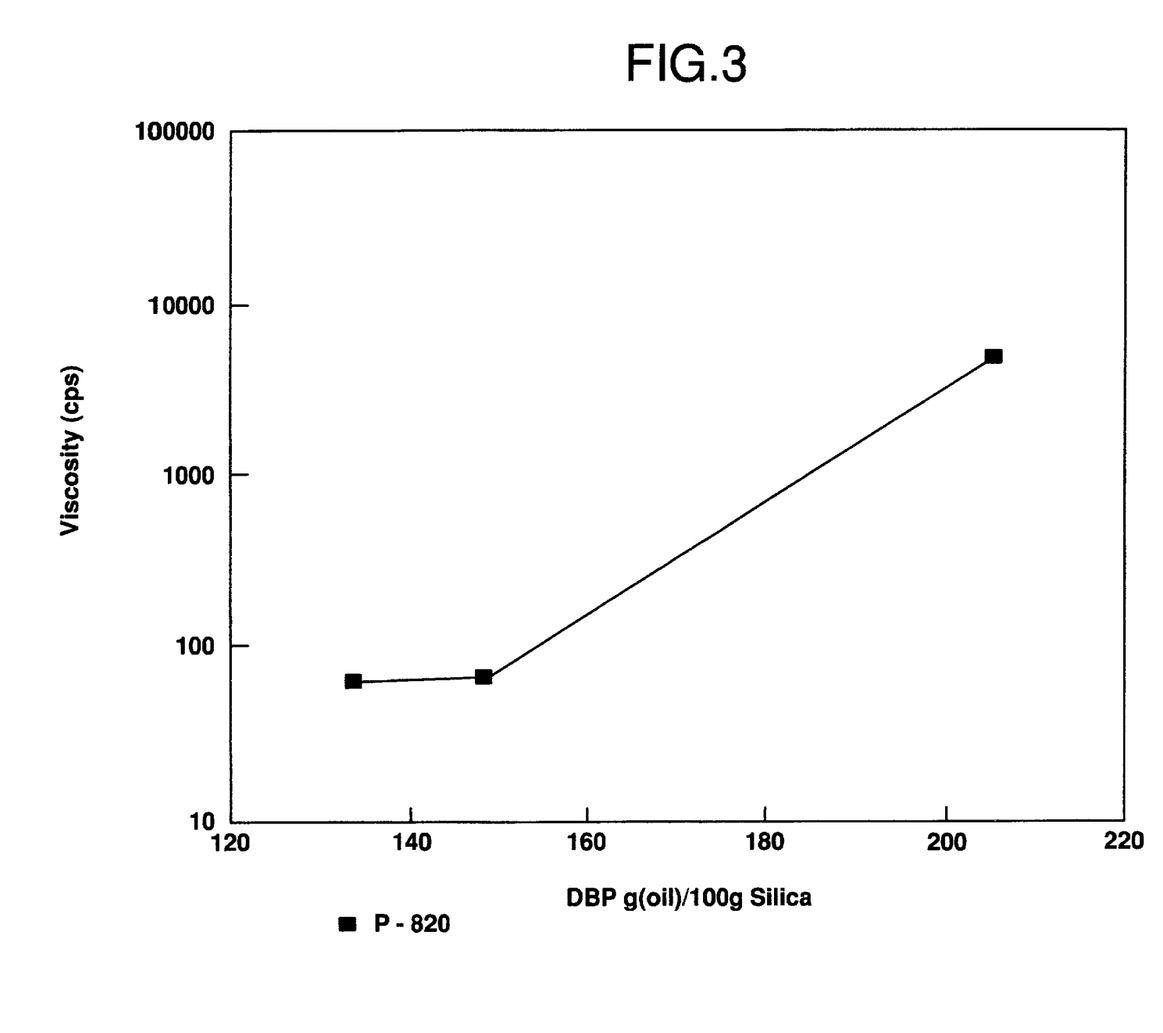
FIG. 3 is a graph showing the changes in slurry viscosity when the solids content is held constant at 36.57% in example 1.
Figure 4:
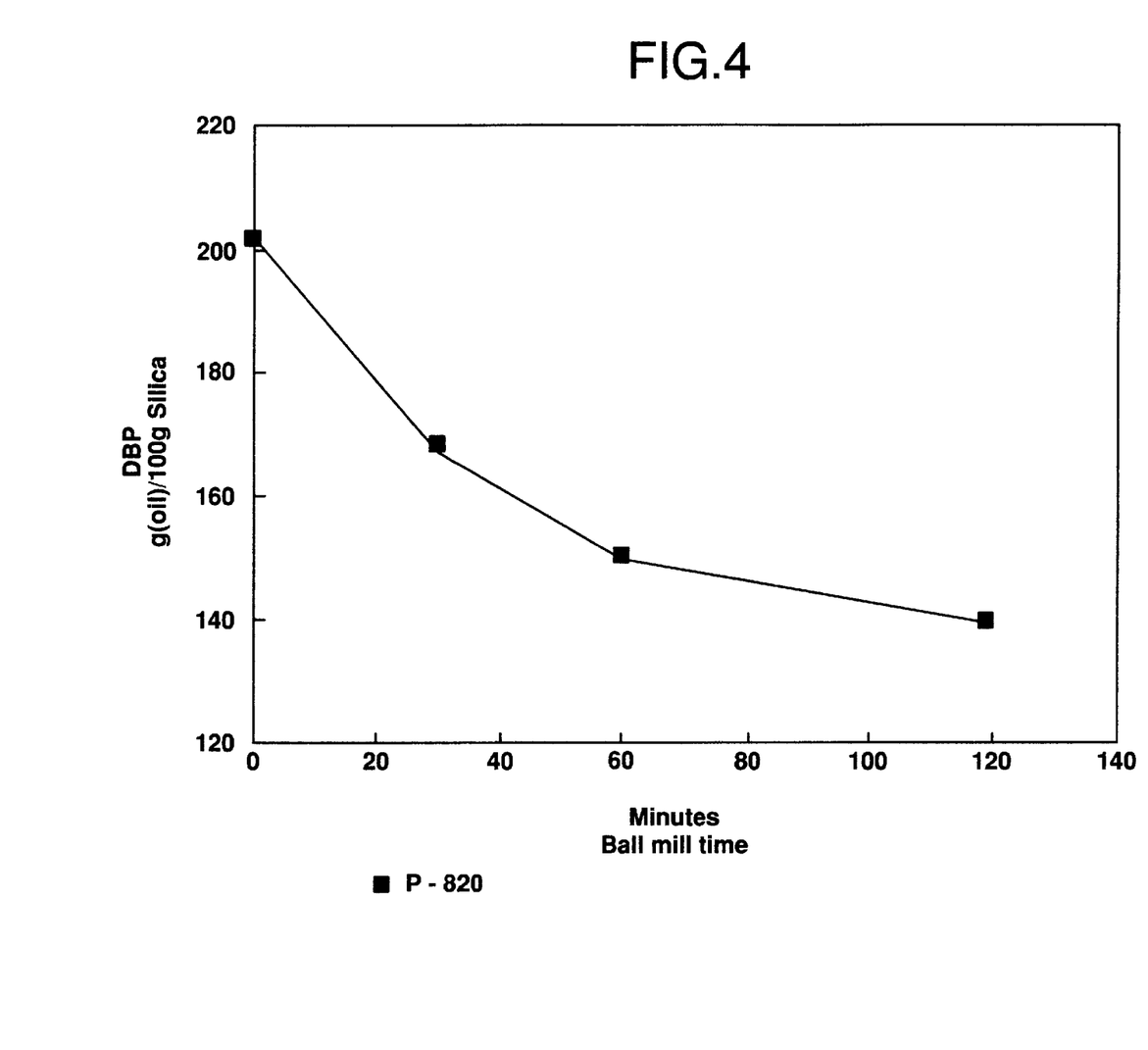
FIG. 4 is a graph showing the influence of milling time on DBP absorption in example 2 according to the invention.

FIG. 3 is a plot of DBP vs. viscosity when the solids content is held constant at 36.57%. A high DBP correlates with increased slurry viscosity.

Table 3 is a summary of changes in the physical characteristics of the aluminum silicate due to milling in example 2. In example 2, the silicate loading was increased to 250 g in order to provide more product for rheological testing. The length of milling was increased in order to compensate for the extra silicate used. The observed trends closely parallel those observed in example 1. For example, particle size increases with increased milling time while DBP and internal surface area decrease with increased milling time. This is entirely consistent with the trends observed in example 1. However, the magnitude of the changes in DBP in example 2 is less than in example 1. This is most likely due to the larger amount of silicate used in example 2. FIG. 2 (analogous to FIG. 1) clearly shows that the amount of destructuring at a specific time in example 2 is less than that of example 1.

Table 4 is a summary of the rheological properties of the aluminum silicate from example 2. For these series of tests, the solids content was varied in an attempt to reach a particular viscosity range. The desired range was 4000–5000 cps, which most standard diaphragm pumps can handle. The data once again reveals that after 30 minutes of milling, a noticeable rheological (viscosity) change takes place. Only after extended milling does another appreciable change occur, notice the 120 minute sample's viscosity. The viscosity is much lower with an increased solids content.

Figure 5:
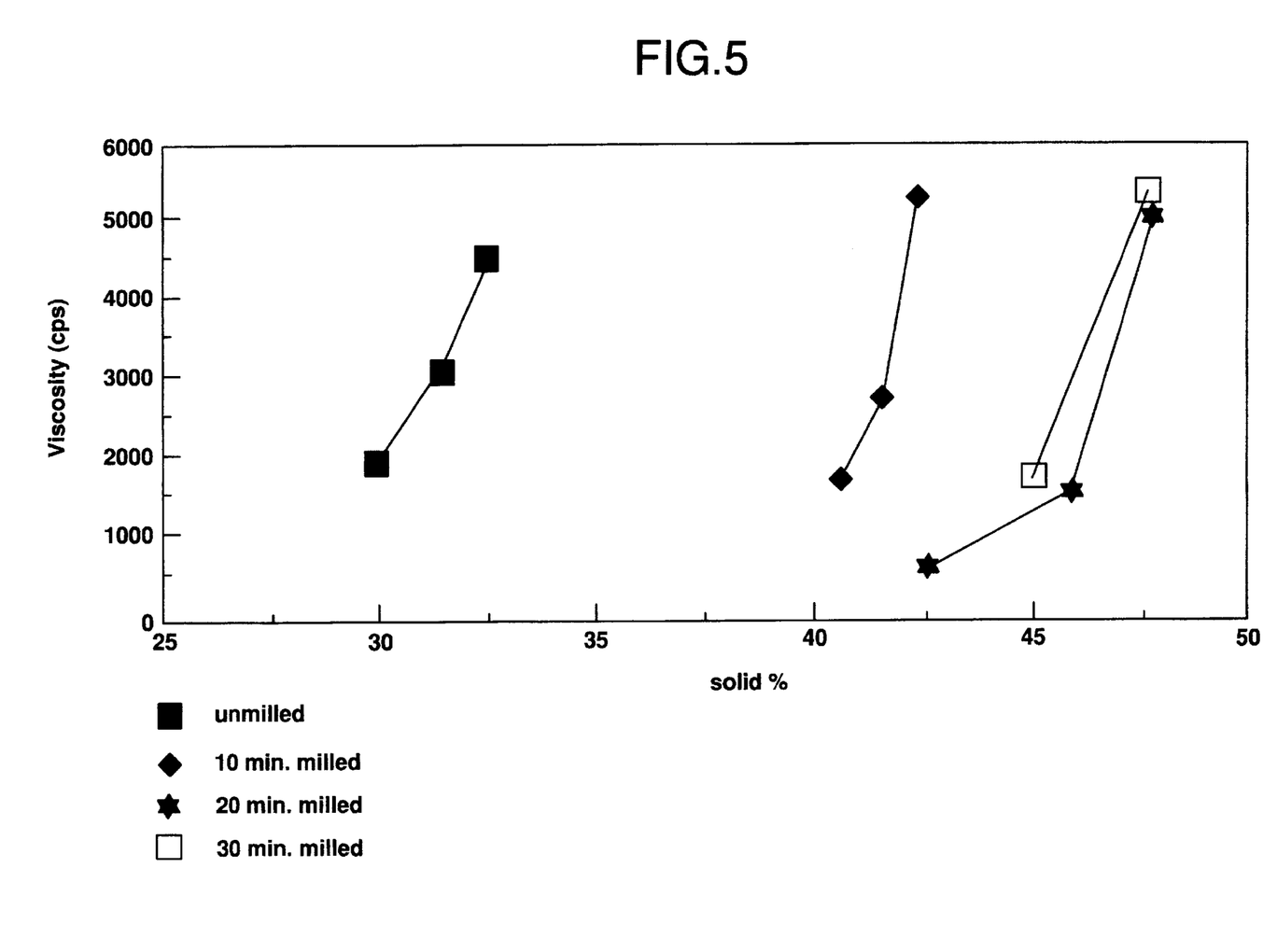
FIG. 5 is a graph showing the Brookfield viscosity of P820 versus slurry solids level for milling times of 0, 10, 20 and 30 minutes.

FIG. 5 plots the Brookfield viscosity of P820 versus slurry solids level for milling times of 0, 10, 20 and 30 minutes. The unmilled P820 reached the 5000 cps range at 33% solids while the material ballmilled for 10 minutes allows the solids level to increase to 44% while maintaining a viscosity in the 5000 cps range. Following 20 minutes of milling the solids level can be increased to 47% while maintaining viscosity in the 5000 cps range. Little additional benefit is observed by continued milling.

The unique physical properties of precipitated silica and silicate products, particularly their large internal void volumes and internal surface areas, allows destructuring to be effectively achieved by ballmilling. The destructuring of aluminum silicate allows for significant increases in aqueous slurry solids while maintaining viscosities that are suitable for conventional pumps (i.e., 5000 cps). In the above examples, the aluminum silicate which was ballmilled for 20 minutes allowed the slurry solids to increase to a final solids of 47%, without significant increases in Brookfield viscosity. The above data suggests that significant transportation savings may be realized by ballmilling aluminum silicate prior to slurry makedown. This would be ideal for the paper industry which is accustomed to handling mineral pigments in slurry form. Specifically, to silicate (Pasilex®) could be ballmilled and madedown at a central facility and shipped to newsprint plants where the advantages of structured silica and silicate pigments are well established. Of course, the reasons for using silicates such as Pasilex®, i.e. reduction in strike through/show through, ink receptivity, and opacity, must not be significantly compromised by destructuring the material.

A further application of destructuring silica and silicate materials may be in the paper coating area. Oftentimes, the rheology of synthetic silicas and silicates constrains their use in conventional coating systems which typically use blade and rod coaters. The net result is that coating can only be done with these pigments at relative low solids levels. As shown above, the attainment of higher solids levels in aqueous slurries via destructuring may allow for increased solids in coating formulations thereby facilitating use of silica pigments in specialty paper coating applications (i.e. ink jet paper).

EXAMPLE 3

A precipitated silica (FK 500LS) was destructured via attritor milling. The milled product exhibits lower DBP numbers and BET surface areas relative to the original material. Destructuring of the material allows the solids content of the silica in aqueous solution to be significantly increased with no increase in viscosity.

The characteristics of the silicas described herein, such as FK 310, that make them applicable for ink jet media are an exceptionally high BET surface area s ranging from about 400 to 700 $m^2/g$.

Dry/milling results in decreased DBP oil absorption and internal surface area of the silica. This allows for significant increases in the solids content of the aqueous slurry with minimal increase in Brookfield viscosity.

The precipitated silica (FK 500LS) was destructured by attrition milling to make it acceptable for ink jet paper coatings. The milling was performed using an Attrition Mill, Model 1-S. The tank used was ceramic lined ($Al_2O_3$) the media used was ¼" Steatite ceramic balls and the shaft sleeves were Tungsten Carbide. The shaft rotational speed was 300 rpm. The silica loading was 150 g per batch. These final parameters were chosen using experience and from adjustments made from previous tests not listed.

Rheological Tests—The instrument used for assessing viscosity was a Brookfield Viscometer, Model RVT using a No. 3 spindle rotating at 10 rpm. The various milled products were all dispersed in distilled water for testing. A 300 ml beaker was used at the test vessel. First, 190 g of water was added to the beaker, and this was placed under a disperser with a Cowles blade. Next, as water was being agitated by the blade, the silica was slowly added and the viscosity periodically checked until the desired consistence was achieved (≈5000 cps). The weight of the silica used was recorded, and the solids content was calculated.

Table 5 displays most of the pertinent results of the testing performed. The values for DBP, particle size, surface area, solids content and viscosity are listed. There are numerous interesting trends exhibited by the destructured silica. For example, the BET surface area and the DBP oil absorption decrease as milling time increases while the solids content necessary to reach the desired viscosity increases. The values obtained for the different categories, except viscosity, are either directly or inversely proportional.

Figure 6:
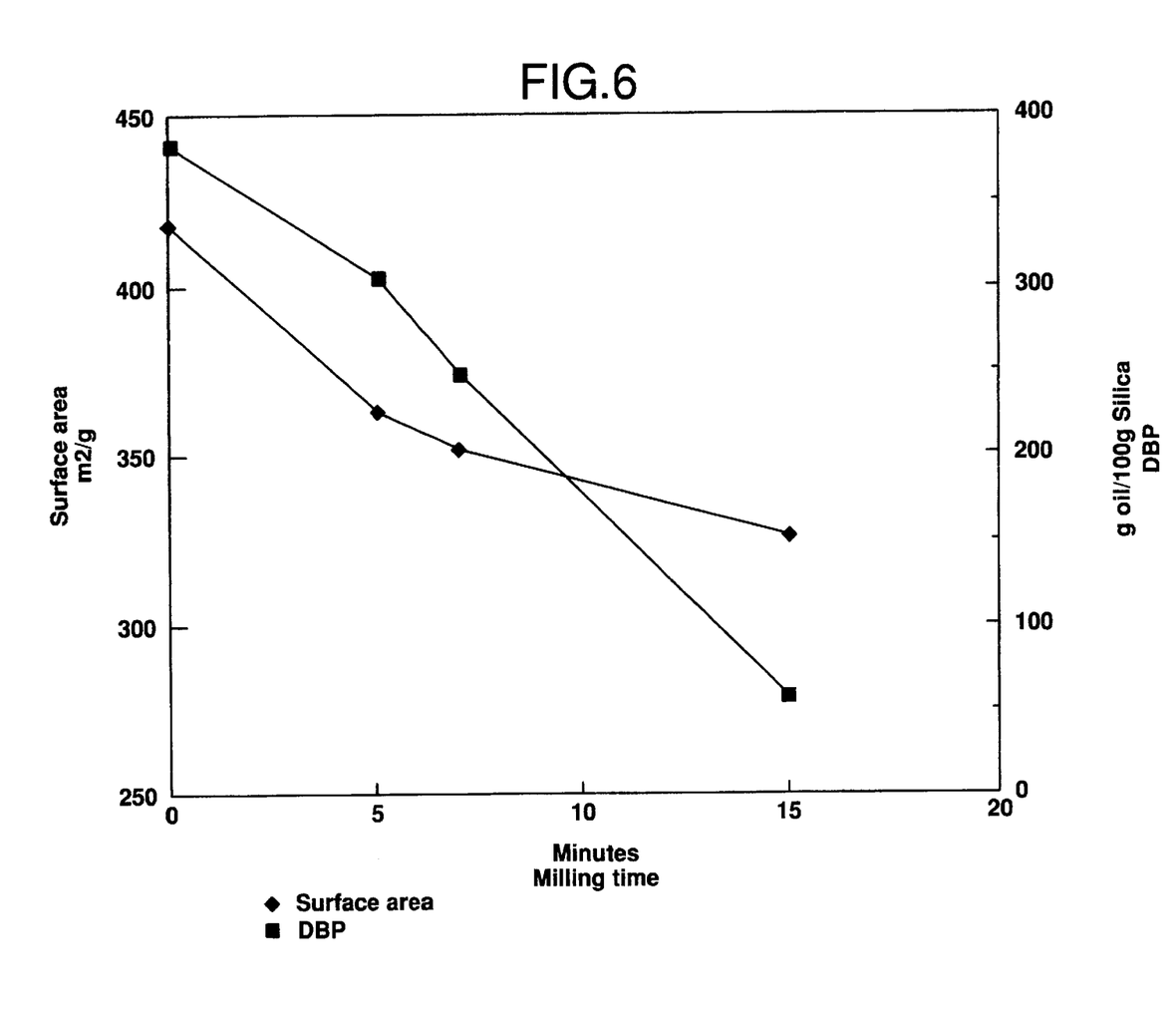
FIG. 6 is a graph showing the changes in DBP and surface area over specific milling time intervals in example 3 according to the invention.

FIG. 6 is a graphical display showing both surface area and DBP. As stated earlier, the surface area and DBP oil absorption both decease with increasing milling time. Surface area decreases linearly with milling time while the rate of decrease in DBP oil absorption, while initially rapid, appears to asymptote after 5 minutes. This trend can be shifted by making various modifications on the milling parameters but, eventually, DBP reduction will become less efficient as destructuring proceeds.

Figure 7:
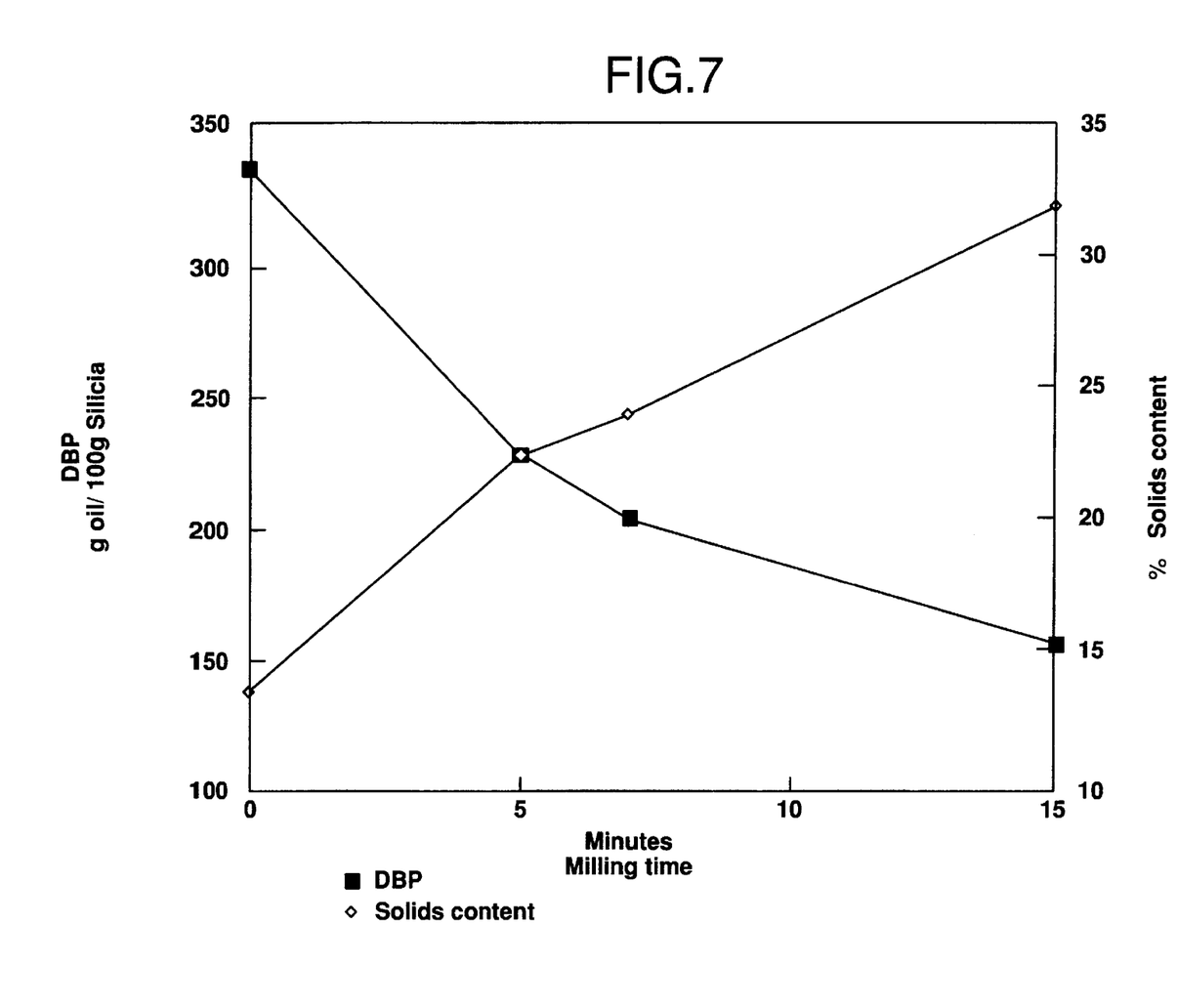
FIG. 7 is a graph showing the changes in DBP and solids content over specific milling time intervals in example 3 according to the invention.

FIG. 7 shows DBP and aqueous slurry solids content (4300–5500 CPS range) as a function of milling time. There is an inverse relationship exhibited between the two. As the DBP oil absorption decreases, the amount of silica required to reach the 4300–5500 cps viscosity range increases. For example, milling the silica for 7 minutes allows the silica solids content to increase from 13.8 to 24.1%, nearly double the solids level of the unmilled material.

Figure 8:
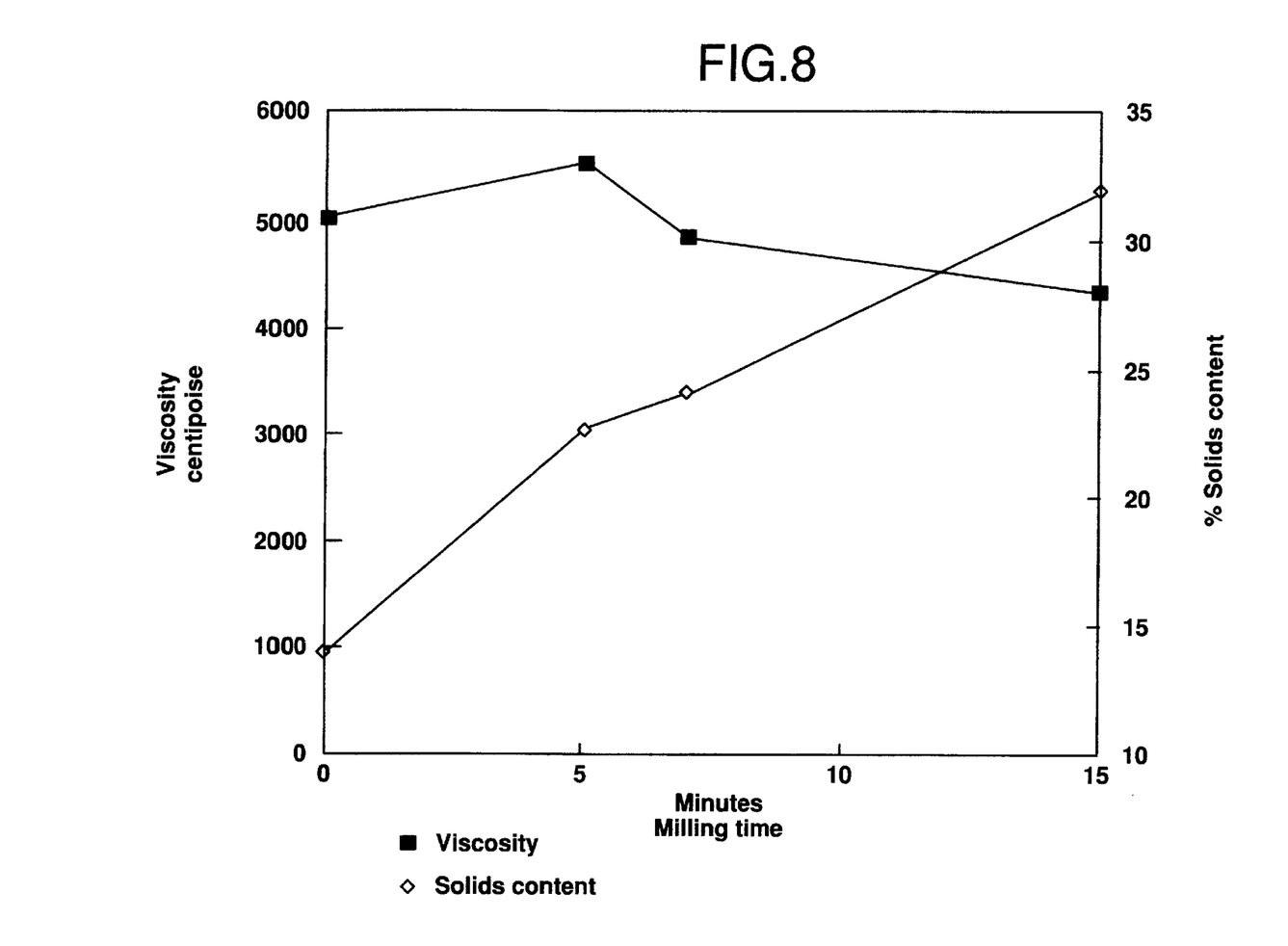
FIG. 8 is a graph showing the changes in viscosity and solids content over specific milling time intervals in example 3 according to the invention.

FIG. 8 is a plot of viscosity and solids content versus milling time. The curve that illustrates viscosity level was intentionally held in the 4800–5500 cps range. This plot serves to graphically illustrate the significant increases in solids levels which can be achieved by attritor milling.

Figure 9:
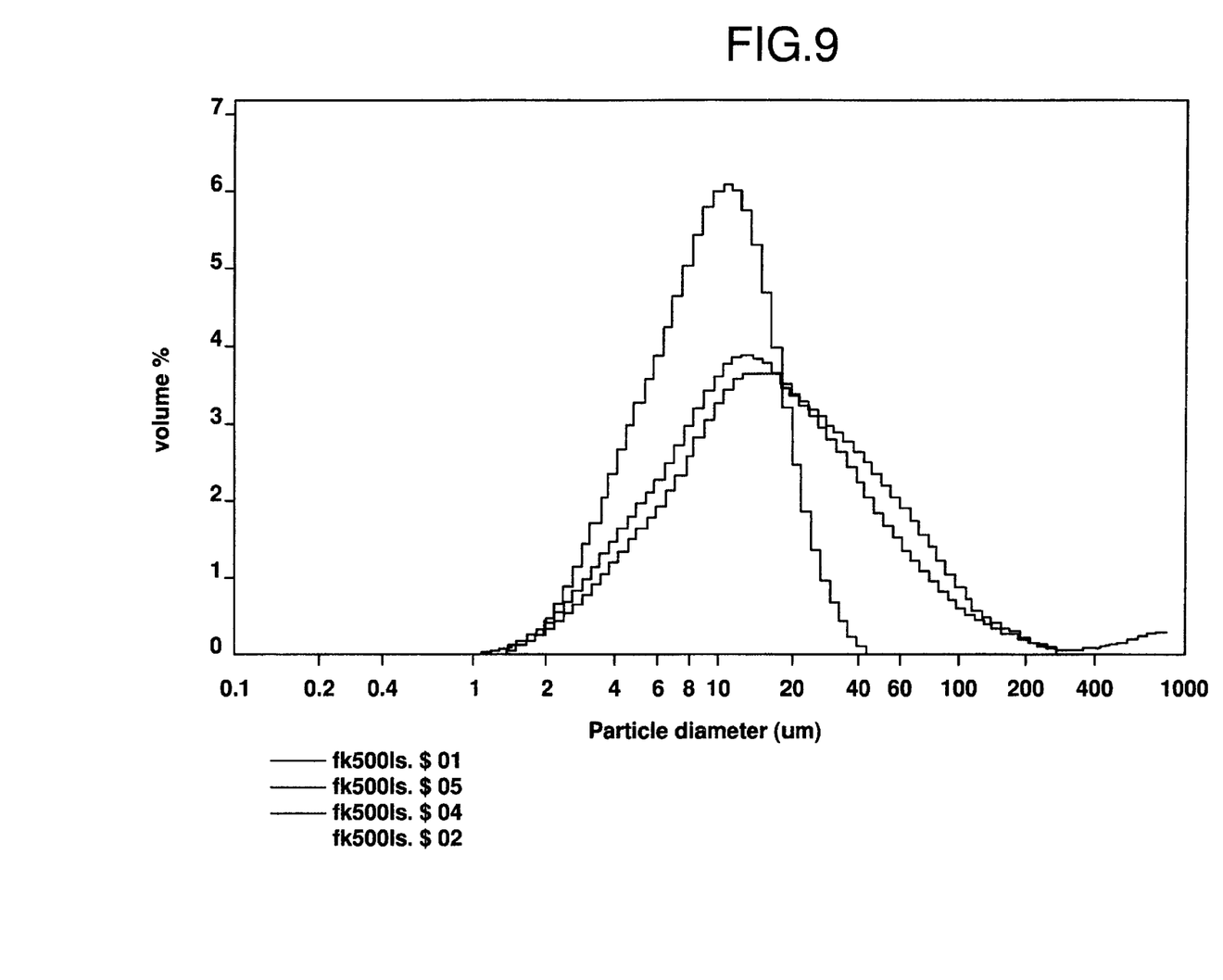
FIG. 9 is a graph showing the particle size distribution curves for original FK 500LS and various attrition milled versions of the FK-500LS in example 3 according to the invention.

FIG. 9 shows the particle size distribution curves for original FK-500LS and various attrition milled versions of the FK-500LS. Examination of the original FK-500LS curve reveals the Gaussian or symmetrical nature of this air jet milled product. During air jet milling, the particle size is reduced, but the silica aggregates retain their overall original spherical shape. This type of milling allows a symmetrical and uniform size distribution to be obtained by laser particle size analysis. In contrast, the attrition milled silica exhibits an unsymmetrical particle size distribution and an increase in agglomerate size. These phenomena are caused by the mode in which the attritor mill operates. In attritor milling, the silica is milled by impingement of the material by the media. Since the silica is slightly malleable and porous, media impingement on the silica agglomerate flattens it, thereby periodically reducing the internal surface while consistently decreasing the external surface area (Tables 6–8). The flattened silica agglomerate particle, when analyzed by laser diffraction particle size analysis, appears to have increased in size since the laser views it in two dimensional space.

Figure 10:
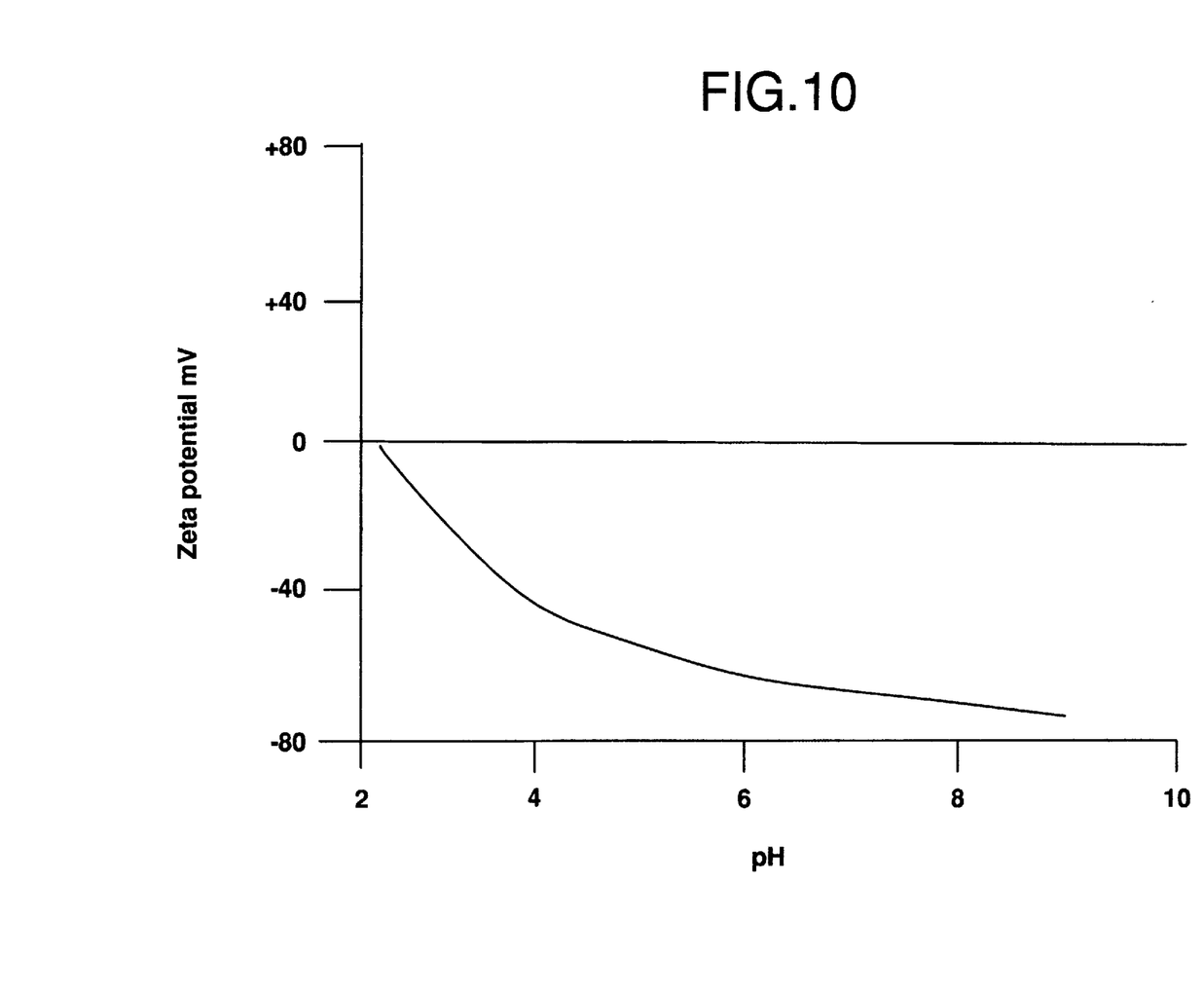
FIG. 10 is a plot of the zeta potential of siliceous pigments as a function of pH.

FIG. 10 shows the zeta potential of siliceous pigments as a function of pH. Synthetic silicas and silicates are anionic in the pH range 3.0 to 10.5 with the zero point of charge occurring at a pH of approximately 2. This is considerably lower than that of $TiO_2$ which has its isoelectric point at a pH of 5.0.

The lower isoelectric point of siliceous pigments has interesting consequences when used in conjunction with $TiO_2$ as fillers in acid papermaking systems. As the pH of $TiO_2$ is lowered from 9.5 to ca. 5.5, flocculation begins to occur. These soft flocs are readily dispersible in fiber. As the pH is lowered below the isoelectric point, denser flocculation occurs with a subsequent loss in dispersion and opacifying power. Use of siliceous pigments prevents formation of dense $TiO_2$ agglomerates. The improved dispersibility allows 2:1 mixtures of $TiO_2$ and siliceous pigments to develop opacity similar to that of pure $TiO_2$. This results in lower raw material costs to the papermaker.

Figure 11:
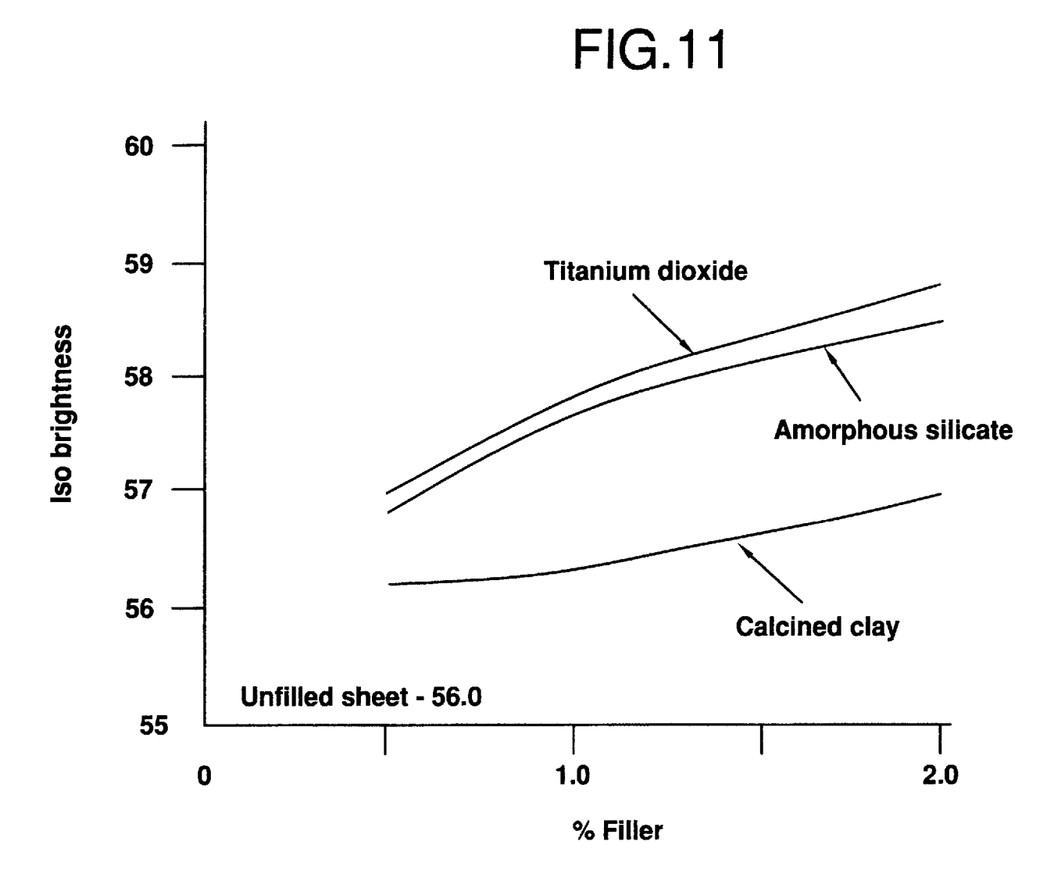
FIG. 11 is a graph of brightness for various fillers.

FIG. 11 shows that use of a precipitated amorphous silicate pigment as a filler in newsprint imparts a Tappi brightness similar to that of $TiO_2$ and significantly greater than that of a low brightness calcined clay.

Figure 12:
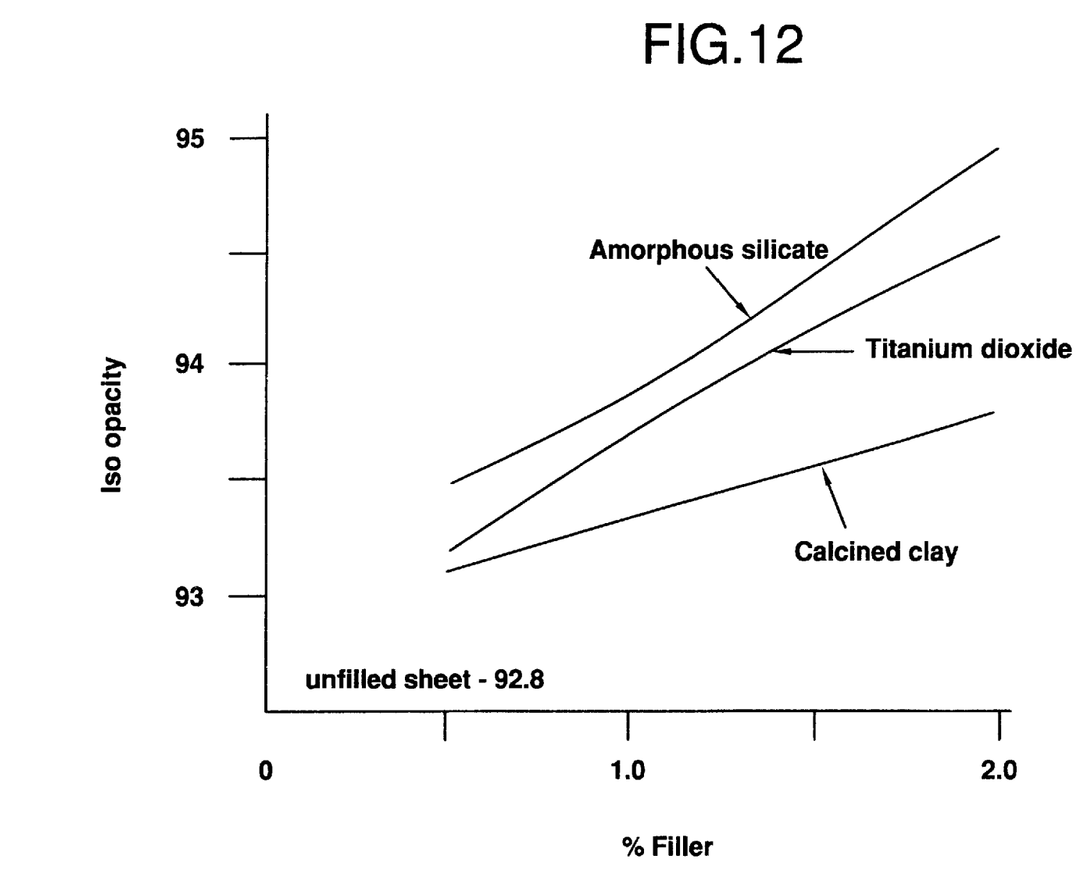
FIG. 12 is a graph of opacity for various fillers.

As mentioned above, although siliceous pigments have a relatively low refractive index of 1.45, their structure results in solid/air interfaces which scatter light. The low bulk density of siliceous fillers, relative to more dense pigments, results in a greater number of particles and greater surface for light scatter at equal loading weights. FIG. 12 shows that a synthetic amorphous silicate imparts grater opacity to newsprint at equal loading weights than either $TiO_2$ or calcined clay.

Three important criteria must be fulfilled for a precipitated silica to be used in coatings for ink jet paper:

1. The BET surface area of the silica should be as high as possible in order to maximize the ink receptivity of the coating. 2. DBP oil absorption should be moderate since high oil absorption results in increased viscosity of the coating and increased binder demand. DBP numbers for an ideal precipitated silica should be <220 grams oil/100 grams silica. 3. The particle size of the silica should be small, preferentially in the 4 μm mean agglomerate size range.

FK 310, since it meets all the above criteria, has proven itself in numerous plant trails both in Europe and in North America. Attritor milled FK-500LS, a high BET surface area product, has value as a domestically produced precipitated silica for ink jet coatings since the decrease in DBP oil absorption upon destructuring allows it to meet the above criteria. In addition, a significant increase in coating solids offers advantages to the paper coater in terms of minimizing the rheological constraints that use of silica currently places on them. Finally, if the silica agglomerates are indeed flattened by the attritor milling process, an increase in smoothness in the paper coating can result since the silica would more likely resemble the flat platelet structure of kaolin clay.

Table 6 shows the results of preparation of ink jet coatings with standard silicas and with destructured silicas.

For the preparation of ink jet coating formulations, polyvinyl acetate is dissolved in an equal amount of water at about 95° C. After that, the precipitated silica destructured as described herein is introduced with stirring at about 1000 rpm and subsequently dispersed therein at 3000 rpm.

Viscosity is measured (Brookfield) after the addition of the silica and also after one hour aging. For experiments in which the solids concentration was adjusted, i.e., undestructured silica experiments, the viscosity is adjusted at 100 rpm by diluting it with distilled water and stirring to 500±50 mPas. After one-half hour aging, the viscosity is then again adjusted at 100 rpm. Additionally, to check stability and shelf life, the viscosity of the ink jet coating formulation is tested after four days aging.

With untreated, non-destructured silicas (FK-500LS and Supernat 50 S), it was not possible to prepare formulations with a solids content of 18% by weight. The ink coating formulation prepared using standard FK-500LS could not be dispersed when only half the amount of pigment is added. The preparation had to be prepared with a spatula and was a dry paste. The product attempted to be made with the structured Supernat 50 S was gel-like and not dispersible. Only with the addition of further water could dispersible preparation be formed, with resulting lower solids content of, for example, 12.7% and 9.6%.

The experiments done by Applicants have demonstrated that by using destructured precipitated silicas formed in accordance with the invention for silicas, such as Supernat 50 S and FK-500LS, it is possible to produce ink jet formulation with a solids content of at least 18% by weight. Moreover, the destructured silicas of this invention exhibit less dust problems and can be more quickly incorporated into ink jet coating formulations. Also, they exhibit essentially no foaming problems when dispersed in conventional ink jet formulations.

In preparing the ink jet formulation, the usual pigments such as kaolin, calcium carbonate and vehicles such as PVA, starch, etc. can be used, as will be apparent to those skilled in the art.

It has also been found to be advantageous to mix a finely divided pyrogenically product silica such as Aerosil MOX 170 (Degussa) with the destructured silica for use in the ink jet formulation.

Further variations and modifications of the foregoing will be apparent to those skilled in the art, and such variations and modifications are intended to be encompassed by the claims that are appended hereto.

TABLE 1

P-820 STRUCTURAL STABILITY
ASSESSMENT OF MILLING ON LOADING CONCENTRATION
Trail #1

| Sample Designation | Moisture Content (%) | Amt of Silicate Used (g) | Media Loading (g) | Drum Rotation (rmp) | Test Duration (min.) | Mean Part. Size (um) | DBP No. # | Change IN DBP | Surface Area (m2), (Internal) | Surface Area (m2), (External) |
|---|---|---|---|---|---|---|---|---|---|---|
| P-820 Unmilled | 6.43 | 140 | 8007 | 63 | N/A | 8.36 | 205 | N/A | 11.53 | 64.18 |
| P-820 | 6.43 | 140 | 8007 | 63 | 15 | 26.25 | 169 | 36 | 8.39 | 65.13 |
| P-820 | 6.43 | 140 | 8007 | 63 | 30 | 26.72 | 149 | 56 | 8.66 | 64.93 |
| P-820 | 6.43 | 140 | 8007 | 63 | 45 | 21.47 | 143 | 62 | 5.08 | 64.51 |
| P-820 | 6.43 | 140 | 8007 | 63 | 60 | 21.57 | 134 | 71 | 3.55 | 64.29 |

TABLE 2

P-820 STRUCTURAL STABILITY
RHEOLOGICAL CHARACTERISTICS
Solids Content Kept @ 36.57%
Trail #1

| Sample Designation | Moisture Content (%) | Amt of Silicate Used (g) | Amt of Water Used (g) | Mixer Speed (rpm) | Mixing Duration (min) | Spindle No. # | Spindle Speed (rpm) | RTV Raw Data | Actual Viscosity (cps) |
|---|---|---|---|---|---|---|---|---|---|
| P-820 Unmilled | 6.43 | 77 | 120 | 4000 | 15 | 5 | 50 | 66 | 5280 |
| P-820 Milled 30 min. | 6.43 | 68 | 105 | 4000 | 4 | 2 | 100 | 16.5 | 66 |
| P-820 Milled 60 min. | 6.43 | 67 | 105 | 4000 | 4 | 2 | 100 | 15.4 | 61.6 |

TABLE 3

P-820 STRUCTURAL STABILITY
ASSESSMENT OF MILLING ON LOADING CONCENTRATION
Trail #2

| Sample Designation | Moisture Content (%) | Amt of Silicate Used (g) | Media Loading (g) | Drum Rotation (rmp) | Test Duration (min.) | Mean Part. Size (um) | DBP No. # | Change IN DBP | Surface Area (m2), (Internal) | Surface Area (m2), (External) |
|---|---|---|---|---|---|---|---|---|---|---|
| P-820 Unmilled | 7.30 | 250 | 8007 | 63 | 0 | 8.491 | 202 | — | 10.32 | 70.76 |
| P-820 | 7.30 | 250 | 8007 | 63 | 30 | 28.59 | 167 | 35 | 8.67 | 72.41 |
| P-820 | 7.30 | 250 | 8007 | 63 | 60 | 25.23 | 149 | 53 | 7.79 | 71.52 |
| P-820 | 7.30 | 250 | 8007 | 63 | 120 | 59.53 | 139 | 63 | 5.92 | 73.64 |

TABLE 4

MILLED P-820
RHEOLOCICAL CHARACTERISTICS @ VARIOUS SOLID LEVELS
Trial #2

| Sample Designation | Moisture Content (%) | Amt of Silicate Used (g) | Amt of Water Used (g) | Mixer Speed (rpm) | Solids Content (%) | Mixing Duration (min) | Spindle No. # | Spindle Speed (rpm) | RTV Raw Data | Actual Viscosity (cps) |
|---|---|---|---|---|---|---|---|---|---|---|
| P-820 Unmilled | 7.30 | 120 | 170 | 4000 | 38.36 | 15 | 5 | 50 | 66 | 5280 |
| P-820 Milled 30 min. | 7.30 | 156.13 | 170 | 4000 | 44.38 | 13 | 5 | 50 | 48 | 3842 |
| P-820 Milled 60 min. | 7.30 | 161.4 | 170 | 4000 | 45.15 | 10 | 5 | 50 | 44 | 3520 |
| P-820 Milled 120 min. | 7.30 | 194.39 | 170 | 4000 | 49.45 | 3 | 5 | 50 | 6 | 480 |

TABLE 5

MILLED FK-500LS
Properties and Characteristics

| Milling time (min.) | Surface Area (m2/g) | DBP (g oil/100 g silica) | Mean Particle Size (um) | Solids Content (%) | Actual Viscosity Reached (cps) |
|---|---|---|---|---|---|
| 0 | 441.42 | 337 | 11.30 | 13.83 | 5000 |
| 5 | 402.64 | 226 | 32.21 | 22.60 | 5500 |
| 7 | 373.63 | 202 | 33.60 | 24.08 | 4800 |
| 15 | 279.09 | 152 | 26.81 | 31.92 | 4300 |

TABLE 6

| | Based on FK 310 Standard Type | Based on FK 310 Standard Type | Based on FK 500 LS Destructured | Based on FK 500 LS Destructured | Based on FK 500 LS Standard Type | Based on Sipernat 50S Destructured | Based on Sipernat 50S Standard Type |
|---|---|---|---|---|---|---|---|
| Formulation # | 210 | 211 | 216 | 212 | 213 | 214 | 215 |
| Components (atro) | 30 T Mowiol 28-99 (PVA) 80T DBP 254 20 T MOX 170 | 30 T Mowiol 28-99 (PVA) 80T DBP 254 | 30 T Mowiol 28-99 (PVA) 80T DBP 254 20 T MOX 170 | 30 T Mowiol 28-99 (PVA) 80T DBP 201 | 30 T Mowiol 28-99 (PVA) 80T DBP 324 | 30 T Mowiol 28-99 (PVA) 80T DBP 200 | 30 T Mowiol 28-99 (PVA) 80T DBP 322 |

TABLE 6-continued

|  | Based on FK 310 Standard Type | Based on FK 310 Standard Type | Based on FK 500 LS Destructured | Based on FK 500 LS Destructured | Based on FK 500 LS Standard Type | Based on Sipernat 50S Destructured | Based on Sipernat 50S Standard Type |
|---|---|---|---|---|---|---|---|
| Solid Content (atro) | 18% | 18% | 18% | 18% | 18%/9.6% | 18% | 18%/12.7% |
| Viscosity acc to Br.f. after formulation | (mPa s) | (mPa s) | (mPa s) | (mPa s) | (mPa s) | (mPa s) | (mPa s) |
| 5 Upm | 5040 | 10560 | 960 | 4640 | 315200/12560 | 8820 | 80060/2400 |
| 10 Upm | 3100 | 5720 | 820 | 2960 | 154000/6960 | 4820 | 55600/1440 |
| 20 Upm | 1800 | 3190 | 620 | 1790 | 180000/3920 | 2720 | 52400/880 |
| 50 Upm | 948 | 1512 | 412 | 916 | >80000/1680 | 1324 | 30480/416 |
| 100 Upm | 604 | 892 | 316 | 586 | >40000/916 | 786 | 15200/228 |
| after 1 h |  |  |  |  |  |  |  |
| 5 Upm | 9000 | 11920 | 3600 | 11000 | —/13680 | 9440 | —/6220 |
| 10 Upm | 4720 | 6100 | 2280 | 5360 | —/7160 | 3840 | —/3300 |
| 20 Upm | 2820 | 3760 | 1495 | 3020 | —/3860 | 2230 | —/1840 |
| 50 Upm | 1464 | 2100 | 898 | 1584 | —/1592 | 1412 | —/908 |
| 100 Upm | 950 | 1376 | 644 | 1050 | —/832 | 940 | —/564 |
| after stirring |  |  |  |  |  |  |  |
| 5 Upm | 3600 | 3320 | 460 | 2880 | —/12400 | 3120 | —/4200 |
| 10 Upm | — | 2580 | 480 | 2260 | —/6720 | 2380 | —/2640 |
| 20 Upm | — | 1890 | 485 | 1660 | —/3640 | 1620 | —/1490 |
| 50 Upm | — | 1220 | 432 | 1000 | —/1490 | 984 | —/736 |
| 100 Upm | 788 | 914 | 408 | 726 | —/780 | 712 | —/469 |
| Viscosity acc to Br.f. after stirring 100 Upm | adjusted 458 mPa s | to 462 mPa s | 500 396 mPa s | ±50 400 mPa s | mPa s 488 mPa s | by diluting 472 mPa s | with water 438 mPas |
| after .5 h/100 Upm | 514 mPa s | 540 mPa s | 456 mPa s | 452 mPa s | 505 mPa s | 540 mPa s | 456 mPa s |
| after 4 d/100 Upm | 660/484* | 662/494* | 748/494* | 652/440* | 830/594* | 552/520* | 570/526* |
| Solid content (atro) at 500 ± 50 mPa s | 17.2% | 16.9% | 17.9% | 17.1% | 9.0% | 17.3% | 12.6% |

*after 4 days and after stirring (100 Upm)

We claim:

1. A method of making an ink jet coating formulation comprising dry milling a precipitated silicate or silica particulate in a media mill for a sufficient period of time to achieve a 30 to 60% reduction in structure as measured by the decrease in DBP number to form a dry milled product of reduced DBP number, dispersing said product into water to obtain aqueous slurry, and mixing said slurry with a binder for producing the desired ink jet coating.

2. The method according to claim 1 wherein said milling is carried out in a ball mill.

3. The method according to claim 1 wherein said milling is carried out in an attrition mill.

4. The method according to claim 1 wherein said mill contains as the media, MgO stabilized zirconia cylinders.

5. The method according to claim 3 wherein said mill contain spherical steatite ceramic attrition media.

6. The method according to claim 3 wherein the attrition mill is run at a shaft rotational speed of about 300 rpm.

7. The method according to claim 1 further comprising milling said silicate or silica particulate so that the media impinge on the said particulate to produce a milled particulate that exhibits an unsymmetrical particle size distribution and is agglomerated and is of decreased BET surface area.

8. An ink jet coating formulation comprising:
   a) a binder vehicle for said formulation
   b) a destructured silicate or silica having a DBP number that is 30 to 60% lower than the DBP under of the un-destructured silicate or silicas.

9. The ink jet coating formulation according to claim 8 which has as solids content of at least 18% by weight.

10. The ink jet coating formulation according to claim 8 wherein said binder vehicle is polyvinyl alcohol in an aqueous dispersion.

11. An ink jet coating formulation made by the method of claim 1.

12. A paper coated with the ink jet coating formulation of claim 8.

13. The method according to claim 1 wherein the solids content of said formulation is increased compared with a formulation containing precipitated silica or silicate not subjected to said dry milling.

14. The method according to claim 1 wherein the viscosity of said aqueous slurry is reduced while the solids content remains the same as compared with an aqueous slurry containing a silica or silicate which has not been subjected to dry milling.

15. A method of making an ink jet coating formulation comprising dry milling a precipitated silicate or silica particulate in a media mill for a sufficient period of time to achieve a 30 to 50% reduction in structure as measured by the decrease in DBP number to form a dry milled product of reduced DBP number, and dispersing said product into water to obtain aqueous slurry.

* * * * *